(12) United States Patent
Otten

(10) Patent No.: US 6,522,865 B1
(45) Date of Patent: Feb. 18, 2003

(54) HYBRID SATELLITE COMMUNICATIONS SYSTEM

(76) Inventor: David D. Otten, 532 S. Gertruda Ave., Redondo Beach, CA (US) 90277

( * ) Notice: Subject to any disclaimer, the term of this patent is extended or adjusted under 35 U.S.C. 154(b) by 0 days.

(21) Appl. No.: 09/371,316

(22) Filed: Aug. 10, 1999

(51) Int. Cl.$^7$ ............................................... H04B 7/185
(52) U.S. Cl. ..................................... 455/13.1; 455/427
(58) Field of Search ................................ 455/427, 428, 455/429, 430, 12.1, 13.1, 13.3

(56) References Cited

U.S. PATENT DOCUMENTS

| | | | |
|---|---|---|---|
| 5,448,623 A | * 9/1995 | Wiedeman et al. | 455/12.1 |
| 5,586,121 A | 12/1996 | Moura et al. | 370/404 |
| 5,634,190 A | * 5/1997 | Wiedeman | 455/13.1 |
| 5,761,605 A | 6/1998 | Tawil et al. | 455/3.2 |
| 5,832,379 A | 11/1998 | Mallinckrodt | 455/427 |
| 5,835,057 A | 11/1998 | van Heyningen | 342/359 |
| 5,835,857 A | 11/1998 | Otten | 455/410 |
| 5,839,053 A | * 11/1998 | Bosch et al. | 455/13.1 |
| 5,852,721 A | 12/1998 | Dillon et al. | 395/200.47 |
| 5,912,883 A | 6/1999 | Hershberg | 370/319 |
| 6,023,605 A | * 2/2000 | Sasaki et al. | 455/12.1 |
| 6,058,307 A | * 5/2000 | Garner | 455/428 |
| 6,078,810 A | * 6/2000 | Olds et al. | 455/428 |
| 6,088,571 A | * 7/2000 | Kane et al. | 455/12.1 |
| 6,160,994 A | * 12/2000 | Wiedeman | 455/12.1 |

\* cited by examiner

Primary Examiner—Nguyen T. Vo
Assistant Examiner—Tu X Nguyen
(74) Attorney, Agent, or Firm—Drummond & Duckworth

(57) ABSTRACT

A hybrid satellite communications system provides communications, particularly Internet access, to computer users. The hybrid satellite communications system includes a satellite system and a terrestrial communications system. The satellite system includes two transceivers. The first transceiver receives and transmits a first set of signals received from the terrestrial communications system to a plurality of user units. In reverse fashion, the satellite systems second transceiver receives a second set of signals in a second frequency band from the user units and transmits those signals back to the terrestrial communications system. The first set of signals (downlink signals) are of much higher frequency than the second set of signals (uplink signals). Preferably, the first set of signals are relayed by a Direct Broadcast System (DBS) satellite in a frequency band between 12.2 GHz and 129 GHz, while the second set of signals are received and transmitted by a Mobile Satellite System (MSS) satellite operating between 1.0 GHz and 3.0 GHz. The differences in frequency between the first set of signals and second set of signals is considered optimal for the transmission and receipt of communications between a computer user with the Internet. Moreover, the present invention is capable of using the present communications infrastructure dedicated to the satellite transmission of television via DBS satellites and satellite cellular communications via MSS satellites.

4 Claims, 6 Drawing Sheets

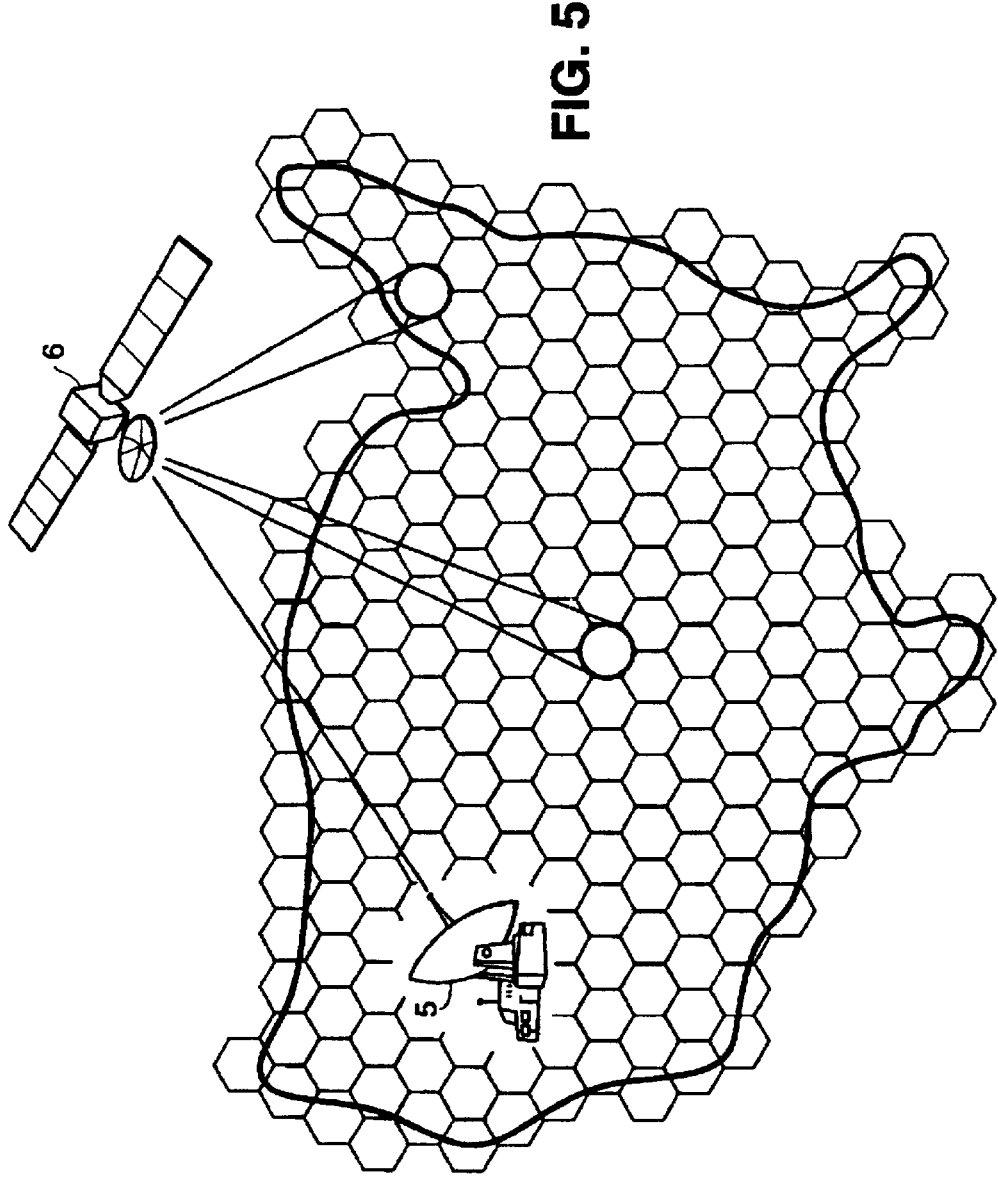

HYBRID SATELLITE COMMUNICATIONS SYSTEM

BACKGROUND OF THE INVENTION

The present invention relates to satellite communications systems. More particularly, the present invention relates to satellite communications systems providing Internet service to computer users.

Computer networking is rapidly becoming ubiquitous in present day society. Computer networks have grown from isolated connections among research scientists and universities to the "information superhighway" of today. Access to this superhighway is typically accomplished through the "Internet". The Internet utilizes a transmission control protocol/Internet protocol TCP/IP communications system which is utilized by hundreds of millions of users worldwide.

Through the use of standardized formats, computer users can easily access and navigate through the abundance of information which is accessible through the Internet. This information includes not only research and news information but has now spread to commercial advertising and business communications which permit users to download images, video, sound clips and/or text documents relating to a company's products. This information is transmitted over the Internet in measurements commonly referred to as bits.

Conventionally, access to the Internet is achieved by using slow, terrestrial dial-up modems through commercial telephone systems such as the public system telephone network (PSTN). Unfortunately, the fastest transmission rate commonly available over the PSTN is 56 K bits per second (bps). Because such transmission rates are prohibitively slow for some practices, such as the transmission of video information, additional systems have been devised including Integrated Services Digital Network (ISDN) and T1 systems which require special cabling to be constructed to the computer user. Unfortunately, ISDN and T1 communications systems are too expensive for the average computer user. Because it will take a long time and substantial expense to connect computer users to the Internet via highspeed transmission lines, such as fiber optic lines, it is desirable to implement some type of highspeed Internet communications system that could be rapidly and inexpensively implemented. Moreover, as explained above, the Internet is largely accessed through telephone lines and dedicated communication lines. Such infrastructure exists today only in developed countries. In undeveloped countries, communities separated by vast distances have limited telephone service, if any. Even where there is telephone service, the quality of the telephone connection is often poorly suited to support the transmission of digital data at a useable rate.

The lack of access to the Internet is rapidly becoming more of a problem as users have expanded beyond academics, researchers and computer enthusiasts and it has become virtually mandatory for members of the general public to participate in the global community via the Internet. For example, physicians in developed countries now confer electronically over the Internet. School children search encyclopedias, obtain information from far away places and even "chat" with other children around the country. Those without access to the Internet are left educationally behind.

To overcome the deficiencies of the present Internet infrastructure, systems have been proposed which make use of satellite communications to access the Internet. For example, Direct TV, a subsidiary of Hughes Electronics, Inc., provides highspeed Internet access through their collection of Direct Broadcast System (DBS) satellites which were originally constructed to provide satellite television service. Unfortunately, the Direct TV system does not provide a communication link for the user to send information back to the Internet via the satellite. Accordingly, a computer user must utilize a separate terrestrial telephone line through the PSTN system or the like to provide communications to an Internet provider. Though the transmission rate from the computer user through the PSTN system to an Internet provider is substantially slower than the downlink from the DBS satellite, this system is generally acceptable as computer users generally receive (download) much greater amounts of data from the Internet than they transmit. Accordingly, it is generally acceptable for the computer user's uplink (transmission) rate to be substantially less than the computer user's download rate. However, the Direct TV system suffers from several disadvantages as a user must have both a satellite receiver and a connection to telephone service. In many portions of the globe, access to both a satellite dish and telephone line are unavailable.

In order to overcome this disadvantage, systems have been proposed which utilize a single satellite system for both the uplink and downlink of Internet data to a computer user. For example, an Iridium/Motorola cellular telephone system provides two-way Internet access at approximately 2.4 K bps. Meanwhile, Inmersat has proposed a satellite cellular telephone system which will provide 64 K bps of Internet access. Similarly, U.S. Pat. No. 5,912,883 issued to Herschberg as the inventor and assigned to WorldCom Systems, Inc., discloses a satellite communication system which optimally would permit 9.6 K bps of Internet access. Unfortunately, these rates for transmission and receipt of data to the Internet are far too slow to be practical for many computer users. For example, the transmission of a few seconds of live action video would take literally hours to be transmitted from the Internet over these satellite systems.

Accordingly, there is a substantial need for a lowcost, highspeed system which provides access for the computer user to the Internet.

It would also be desirable if an Internet communication system were provided which could substantially utilize existing communications infrastructure.

Moreover, it would be particularly desirable to provide a communications system which could access the Internet which did not require the utilization of telephone lines or highspeed transmission cables. To this end, it would be even more desirable if the communication system provided the computer user with mobile access to the Internet and/or access to the Internet from remote areas around the world.

SUMMARY OF THE PRESENT INVENTION

Briefly, in accordance with the invention, I provide an improved apparatus and method for providing communications to a computer user or the like. More particularly, my invention is a hybrid satellite communications system which is particularly suitable for providing Internet access to a computer user. The hybrid satellite communications system includes one or more satellites, one or more terrestrial communication stations and a plurality of user units. The one or more satellites act as relay stations and include a first transceiver for receiving and transmitting a first set of RF signals in a first frequency band and a second transceiver for receiving and transmitting a second set of RF signals in a second frequency band. Preferably, the first frequency band is at a significantly higher frequency than the second frequency band.

In operation, the user units, typically including personal computers, transmit signals in the second frequency band to the orbiting satellite system. The second signals are then relayed by the satellite system back to terrestrial ground stations which are connected to an Internet provider by the PSTN system or the like. In this manner, a user's computer can access, send data or information to the Internet, via the second set of signals passing through the satellite system. In reverse manner, data from the Internet is transmitted to a computer user. The Internet Service Provider is connected to a terrestrial ground station which transmits the Internet data in the form of the first set of signals to the satellite system. The satellite system relays the first set of signals back to the computer user enabling the computer user to decode the Internet information to download images, video, sound clips, business advertising or the like. For purposes herein, the first set of signals will be referred to as "downlink signals" as they refer to the signals which are downlinked from the satellite to a computer user. Similarly, the second set of signals will be referred to herein as "uplink signals" as they refer to the signals which are transmitted from the computer user.

As stated above, the transmission rate from the user's computer through the satellite system to the Internet Service Provider is slower than the transmission rate of information provided from the Internet provider to the computer user. This is generally acceptable as computer users typically need to download much larger amounts of data from the Internet than they send.

In a preferred embodiment, the hybrid satellite communications system of the present invention transmits the downlink signal from the satellite system to the user's computer in X band and/or K band. More preferably, the hybrid satellite communications system uses a standard Ku band Direct Broadcast System (DBS) satellite to send the downlink signals from the Internet Service Provider to the computer user. DBS refers to satellite transmission of signals dedicated by the U.S. Federal Communications Commission in the electromagnetic spectrum from 12.2 GHz to 12.7 GHz for DBS broadcasting. This frequency band has been reserved primarily for the transmission of television signals. Meanwhile, it is preferred that the uplink signals from the user's computer to the Internet Service Provider be relayed by a Mobile Satellite System (MSS) satellite operating in L-band or S-band or both. More particularly, it is preferred that the return link be limited to the frequency band dedicated for mobile satellite communications between 1.0 GHz and 3.0 GHz, though between 1.9 GHz and 2.2 GHz is even more preferable.

In additional preferred embodiments, the hybrid satellite communication system includes at least two satellites, preferably a DBS satellite and an MSS satellite. A first satellite is provided for receiving and transmitting the downlink signals at the higher frequency band from the Internet Service Provider through the first satellite to the user's computer, while a second satellite is provided for receiving and transmitting the uplink signals at a much lower frequency band from the user's computer to the Internet service provider. As would be understood by those skilled in the art, one or more ground stations would typically be provided for relaying data between the first and second satellites and the Internet Service Provider.

In still an additional preferred embodiment, the hybrid satellite communications system includes a plurality of terrestrial nodes which cooperate with the second transceiver, which relays the uplink signals, to offload communications between the user's computer and the second transceiver. More particularly, the terrestrial nodes operate in similar manner to the second transceiver, such as an MSS satellite, and terrestrial communications system in that they relay uplink signals including Internet information from the user's computer to the Internet Service Provider. Depending on the number of computer user's on the system, atmospheric conditions, etc., instead of utilizing a second satellite for receiving the uplink signals from the computer user, the computer user transmits the uplink signals to terrestrial nodes which relays any Internet inquiries, information or data to the Internet Service Provider. In a preferred embodiment, the terrestrial nodes utilize a standard cellular telephone communication system which is connected to an Internet Service Provider by the PSTN. For example, where the computer user is capable of communicating with a terrestrial cellular telephone communications system, it would typically be less expensive to transmit the uplink signals to terrestrial nodes than to transmit the uplink signals to a second satellite transceiver. However, where the computer user is too distant from a terrestrial cellular telephone system to operate effectively, the computer user, automatically or based on manual instructions, transmits uplink signals to the orbiting satellite system. Of course, even where the computer user is in range and transmits uplink signals to a terrestrial node, it is an object of the present invention that the downlink signals still be relayed by the satellite system to the user's computer as typical terrestrial cellular telephone systems operate at transmission rates too slow to be practical for most computer users.

Other aspects and advantages of the invention will become apparent from the following detailed description and the accompanying drawings illustrating by way of example the features of the present invention.

BRIEF DESCRIPTION OF THE DRAWINGS

FIG. 5 illustrates a preferred embodiment of the present invention in which the satellite divides its territorial coverage into cells;

DETAILED DESCRIPTION OF THE PREFERRED EMBODIMENTS

Figure 1:
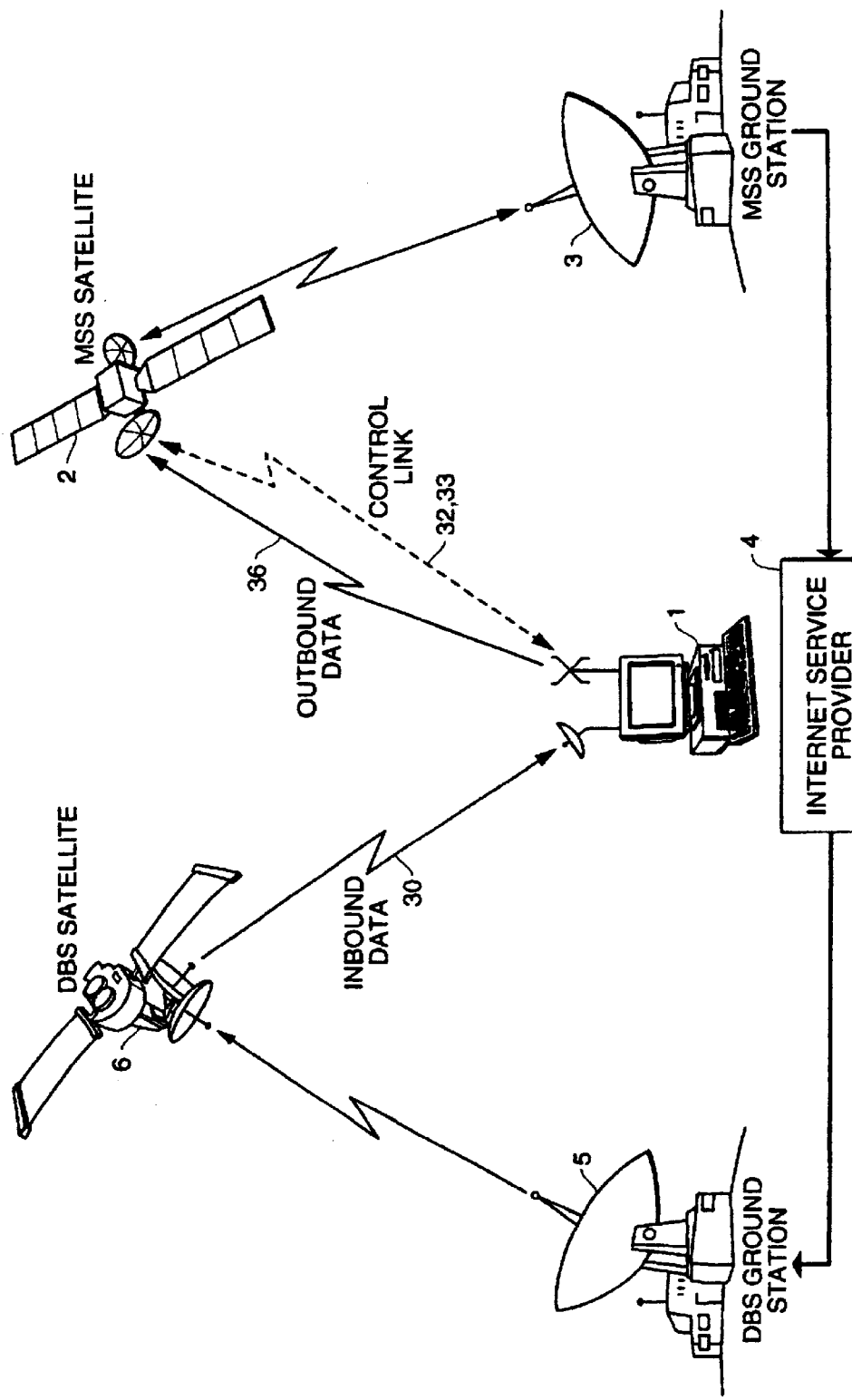
FIG. 1 is a diagram showing an overview of the principal elements of the hybrid satellite communications system of the present invention.

While the present invention is susceptible of embodiment in various forms, there is shown in the drawings and will hereinafter be described the presently preferred embodiments of the invention with the understanding that the present disclosure is to be considered as an exemplification of the invention and is not intended to limit the invention to the specific embodiments illustrated.

Figure 2:
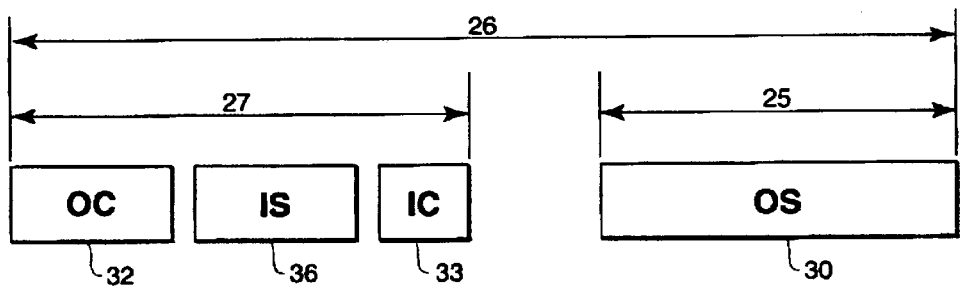
FIG. 2 is a diagram illustrating the frequency sub-bands as allocated in a preferred embodiment of the present invention.
Figure 3:
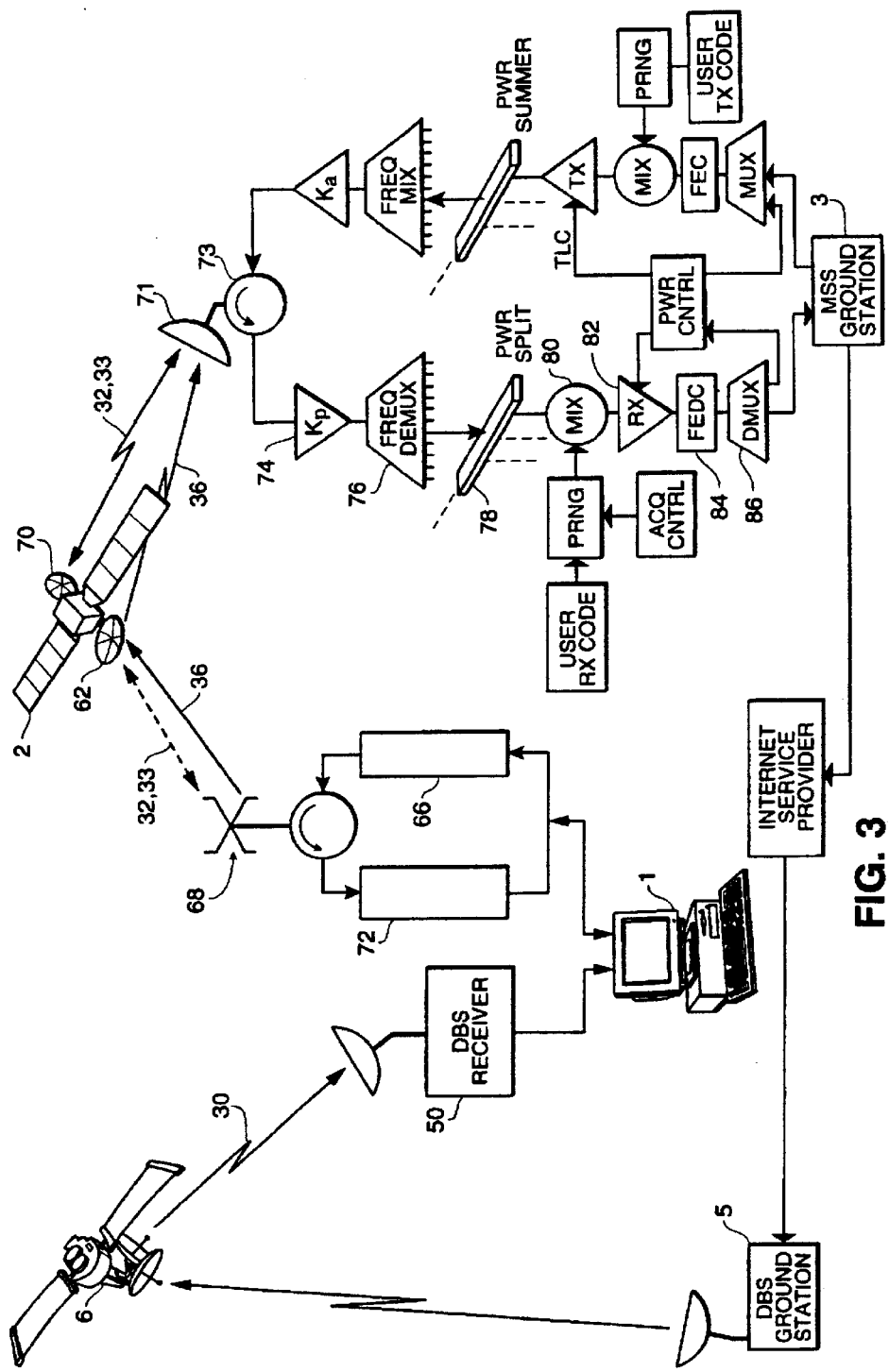
FIG. 3 is a block diagram showing the interrelationship between ground stations, satellite nodes and a computer user for providing communications between a computer user and an Internet Service Provider as practiced by the present invention.

Referring to FIGS. 1–3, the present invention is directed to a hybrid communications system which is particularly adapted to providing Internet service to a computer user. The hybrid satellite communications system includes a plurality of user units 1, each typically including a personal computer, a satellite system and a terrestrial communications system. The satellite system includes a first transceiver 6 for receiving downlinked signals from the terrestrial communications system and for transmitting those downlinked signals to the user's computer 1. The satellite system further includes a second transceiver 2 for receiving uplink signals 36 from a user's computer 1 and for transmitting those uplink signals back to the terrestrial communications system. As shown in FIGS. 1 and 3, preferably the terrestrial communications system includes separate ground stations 3 and 5 for receiving the uplink signals relayed by satellite 2 and for transmitting downlink signals relayed to the user's computer by satellite 6, respectively. The terrestrial communications system, as shown with ground stations 3 and 5, is connected to an Internet Service Provider such as Yahoo, CompuServe, AOL, Earthlink, etc. through the PSTN system or similar infrastructure known to those skilled in the art.

Of importance to the practice of the present invention, the downlink signals 30 are at a substantially higher frequency than the uplink signals 36. In order to overcome the disadvantages of the prior art, which provides either very slow Internet access or requires both a satellite link and a connection to the commercial telephone system, the present invention is a highly efficient hybrid communications system in which the downlink signals are preferably transmitted in X-band and/or K-band while the uplink signals are transmitted in L-band and/or S-band. For purposes of the present invention, these bands are defined as follows.

| Band | Frequency (GHz) | Wavelength (cm) |
|------|-----------------|-----------------|
| P | 0.225–0.390 | 133.3–76.9 |
| L | 0.390–1.550 | 76.9–19.3 |
| S | 1.55–5.20 | 19.3–5.77 |
| X | 5.20–10.90 | 5.77–2.75 |
| K | 10.90–36.00 | 2.75–0.834 |
| Q | 36.0–46.0 | 0.834–0.652 |
| V | 46.0–56.00 | 0.652–0.536 |
| W | 56.0–100.00 | 0.536–0.300 |

*C Band includes 3.90–6.20 GHz

Even more preferably, the downlink signals are provided by a DBS satellite 6 transmitting at between 12.2 GHz and 12.9 GHz while the uplink signals are transmitted at between 1.0 GHz and 3.0 GHz to an MSS satellite 2. The use of two satellites which transmit and receive signals at substantially different frequency bands is ideal for practicing the present invention as Internet users typically require substantially higher frequency transmission rates to receive information from the Internet than to transmit information to the Internet, as computer users typically download far greater amounts of information from the Internet than they send.

Referring to FIG. 2, the allocated frequency band 26 of the hybrid communications system is divided into two primary sub-bands 25 and 27. Sub-band 27 is dedicated to low frequency communication between the user's computer 1 and MSS satellite 2 and includes three (3) lesser sub-bands, outbound calling and command sub-band 32, inbound satellite sub-band 36 and inbound calling and tracking sub-band 33. The frequency band between the user's computer 1 and MSS satellite 2 typically requires three (3) sub-bands as the MSS satellite will typically operate using a time division multiple access (TDMA) or code division multiple access (CDMA) protocol which require synchronization and tracking which, in turn, require communication between the computer user 1 and MSS satellite through sub-bands 32 and 33. When the computer user wishes to transmit data or information to the Internet Service Provider 4, this information is transmitted in the frequency sub-band designated inbound satellite 36.

OS: Outbound Satellite 30 (satellite to computer user)
OC: Outbound Calling and Command 32 (satellite to computer user)
IS: Inbound Satellite 36 (computer user to satellite)
IC: Inbound Calling and Tracking 33 (computer user to node)

Meanwhile, communication between the DBS satellite 6 and the user's computer 1 would typically be transmitted through frequency division multiple access (FDMA) which does not require two-way synchronization and tracking. Accordingly, the entire high frequency sub-band 25 can be dedicated to the transmission of Internet information on the sub-band designated outbound satellite 30.

Referring back to FIGS. 1 and 3, in operation, the user 1 will utilize a first fixed antenna with a moderate gain to initiate the communications to the Internet provider. A user wishing to access the Internet simply instructs his computer to dial the number of the Internet Service Provider, sending the call. Typically, this is done automatically using his computer by means well known in the art. Thereby an incoming call sequence is initiated in the IC sub-band. This call is heard by the MSS satellite 2 which forwards the call to the MSS ground station 3. The call handling element then initiates a handshaking function with the calling unit over the OC 32 and IC 33 sub-bands, leading finally to transition to the establishment of the call to the Internet Service Provider 4. This link is through the MSS satellite 2 using, in one embodiment, either L- or S-band frequencies. Preferably, the antenna used for this link would be a yagi antenna with a gain of about 12 db. This antenna has a beamwidth of about 60° which is very easy to install. The resulting digital communication can take place at varying bit rates up to approximately 2 megabits per second. Typically, these would be short bursts since the user generally sends less information then he receives. The signal is then processed in the MSS ground station 3 which sends it to the Internet Service Provider 4. The Internet Service Provider 4 automatically processes the request by means well known in the art and sends the desired information to the DBS ground station which processes the signal and sends it to the DBS satellite by means well known in the art. The DBS satellite sends the signal to the user. The user receives the signal by means of a standard 18" DBS receive only antenna. For simplicity, as shown in FIGS. 1 & 3, the user's computer includes two antennas, with a first antenna for communication with the MSS satellite and the second antenna for receiving signals from the DBS satellite. However, as would be understood by those skilled in the art, these two antennas may be combined in a single antenna structure for communicating with both the MSS satellite and the DBS satellite.

Referring also to FIG. 3, a block diagram is shown of a typical user unit 1 to MSS satellite 2 to MSS ground station 3 communication and the processing involved in the user unit 1 and the MSS ground station 3. In placing a call for example, the user's computer 1 is commanded to dial the Internet Service Provider 4 telephone number as previously entered by the user. After confirming a display of the number dialed, the computer sends the call signal. This signal is processed through the transmitter processing circuitry 66, which if transmitted by CDMA protocol, includes spreading the signal using a calling spread code. The signal is radiated by the moderate gain antenna 68 and received by the MSS satellite 2 through its narrow beamwidth antenna 62. The satellite processes the received signal as will be described below and sends them to the MSS ground station by way of its backhaul antenna 70. On receive, the antenna 68 of the user unit 1 receives the signal and the receiver processor 72 processes the outbound control signal 32.

The MSS ground station 3 receives the signal at its antenna 71, applies it to a circulator 73, amplifies 74, frequency demultiplexes 76 the signal separating off the composite signal which includes the signal from the user shown in FIG. 3, splits it 78 off to one of a bank of code correlators, each of which comprises a mixer 80 for removing the spreading and identification codes, an AGC amplifier 82, the FECC demodulator 84, a demultiplexer 86 and finally the signal is then routed to the appropriate land line, such as a commercial telephone system, for example, the PSTN. Transmission by the MSS ground station 3 is essentially the reverse of the above described reception operation.

Figure 4:
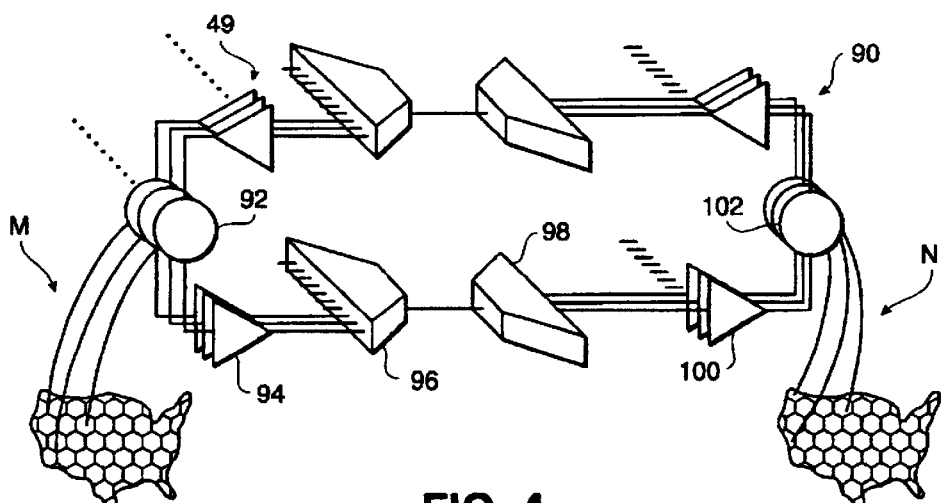
FIG. 4 is a block diagram illustrating one embodiment of satellite signal processing as practiced by the present invention.

Referring now to FIG. 4, the satellite transceiver 90 of the MSS satellite 2 is shown in block diagram form. Preferably, a circulator/diplexer 92 receives the uplink signal and applies it to an L-band or S-band amplifier 94 as appropriate. The signals from all the M satellite cells within a "cluster" are frequency multiplexed 96 into a single composite K-band backhaul signal occupying M times the bandwidth of an individual L-/S-band mobile link channel. The composite signal is then split 98 into N parts, separately amplified 100, and beamed through a second circulator 102 to N separate satellite ground cells. This general configuration supports a number of particular configurations various of which may be best adapted to one or another situation depending on system optimization which for example may include considerations related to regional land line long distance rate structure, frequency allocation and subscriber population. Thus, for a low density rural area, one may utilize an M-to-1 (M>1, N=1) cluster configuration of M contiguous cells served by a single common satellite ground node with M limited by available bandwidth. In order to provide high-value, Internet service between metropolitan areas, already or best covered for local calling by ground cellular technology, an M-to-M configuration would provide an "inter-metropolitan bus" which would tie togther all occupants of such M satellite cells as if in a single local calling region. To illustrate, the same cells (for example, Seattle, Los Angeles, Omaha and others) comprising the cluster of M user cells on the left side of FIG. 4, are each served by corresponding backhaul beams on the right side of FIG. 4.

Preferably, MSS satellite 2 and DBS satellite make use of the highest feasible satellite antenna gain. In one embodiment, power gain on the order of 45 dB and beamwidth of under 1° are envisioned. This is depicted in FIG. 5 and is accomplished by an antenna size of approximately 20 meters for the MSS satellite. The use of such narrow beams also permits a far more efficient use of spectrum, the other limited commodity, since spectrum can be reused many times with a large number of beams. In the case of the DBS antenna, in one embodiment, an antenna with multiple narrow beams with each bandwidth of under 1° as depicted in FIG. 5 is used to reduce satellite power and to increase the frequency efficiency.

Figure 6:
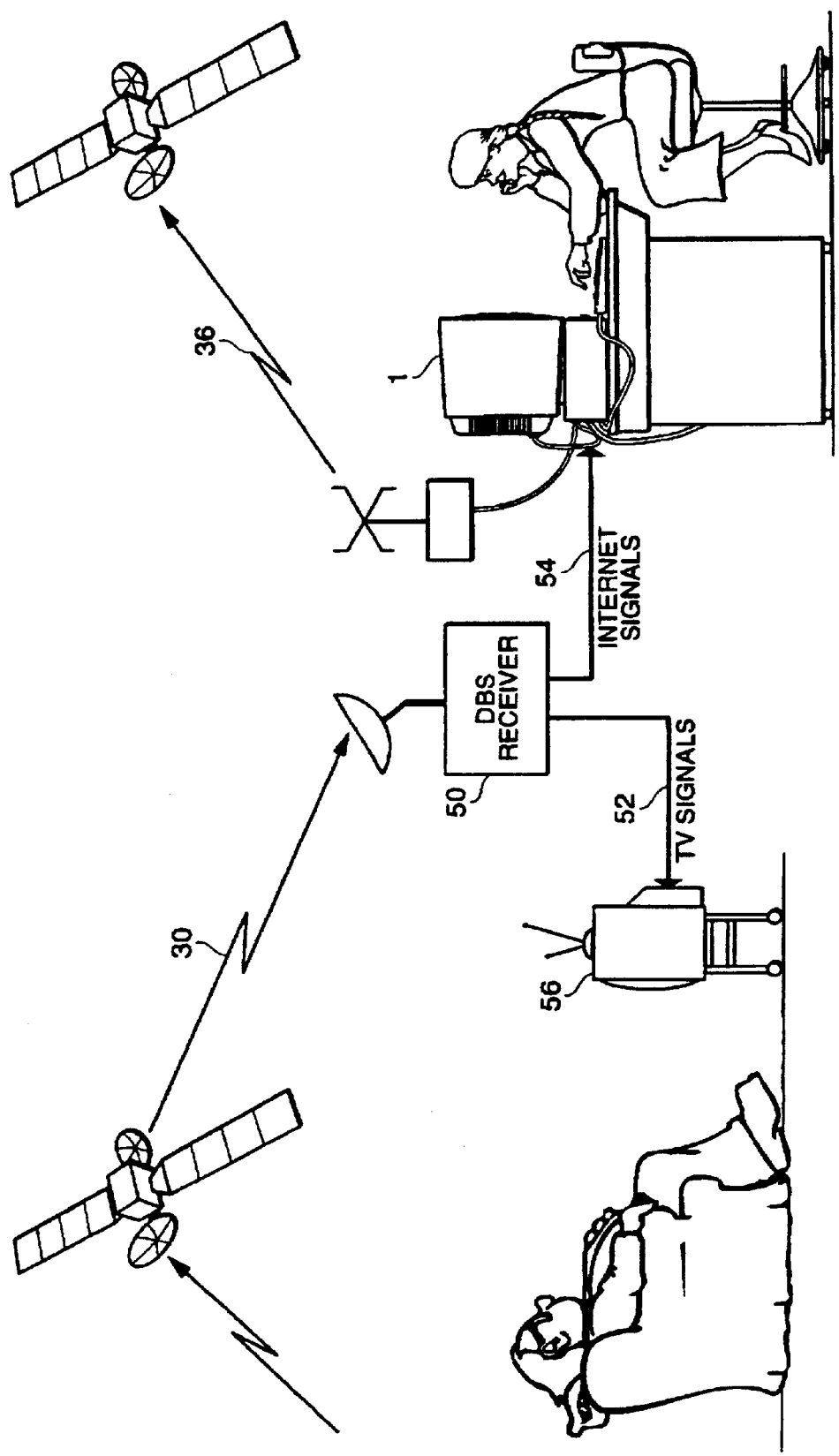
FIG. 6 is a block diagram illustrating a computer user of the hybrid satellite communications system of the present invention.

Referring to FIG. 6, the signals from the DBS satellite are received by the user's DBS antenna typically an 18" diameter dish and focused on a Low Noise Block downconverter with integrated Feed (LNBF). Signals go from the LNBF to the DBS receiver 50 where they are amplified, decoded and processed. Where the downlink signal 30 includes both television signals 52 and Internet signals 54, the DBS receiver includes a splitter which separates the TV signals 52 and Internet signals 54 for transmission to respective television 56 and computer 1. The separation of the TV signal and Internet signal can be accomplished by those skilled in the art and is not discussed further herein. The Internet signals addressed to this particular user are then sent to his computer.

Figure 7:
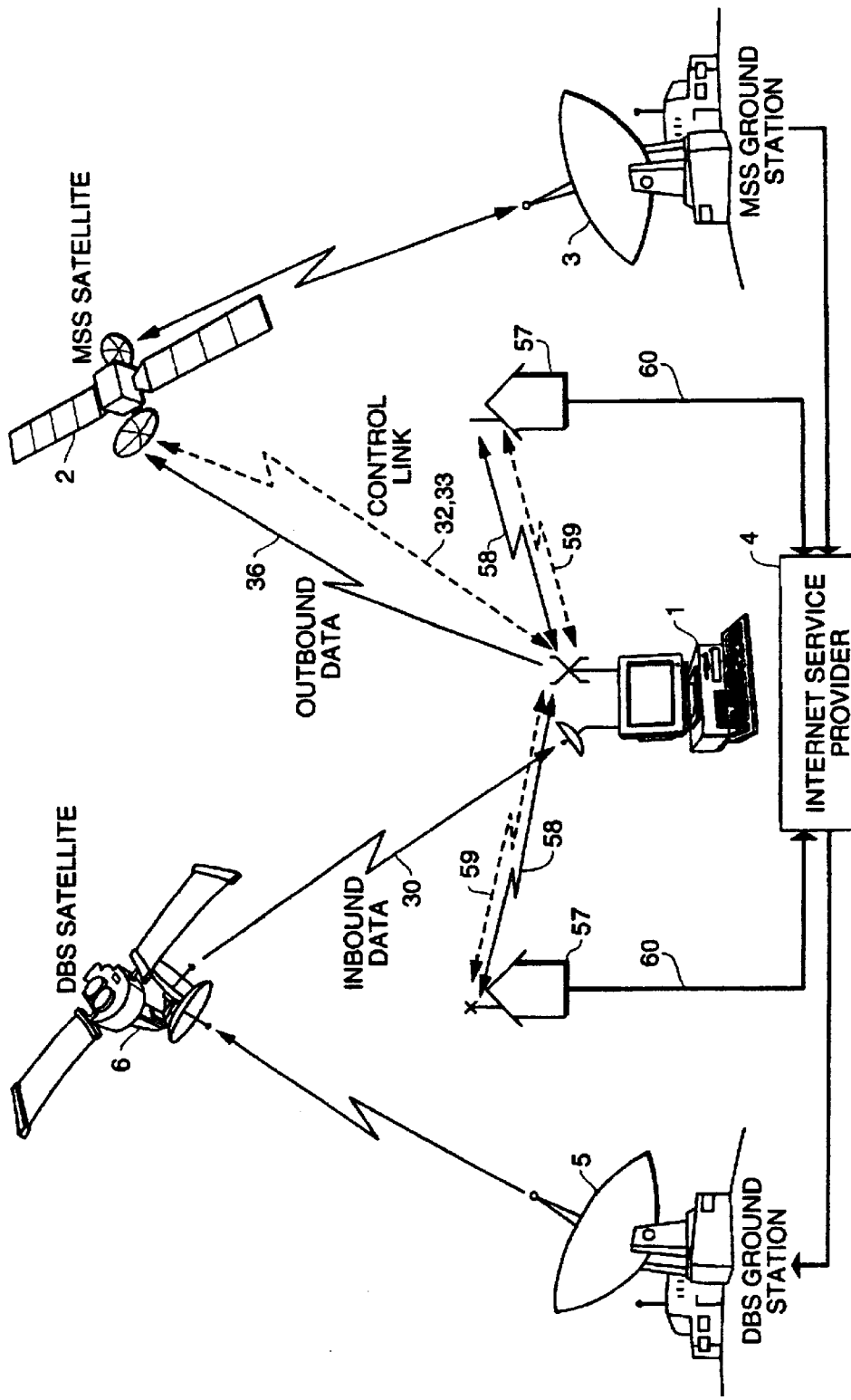
FIG. 7 is block diagram illustrating a preferred embodiment of the hybrid satellite communications system of the present invention including a plurality of terrestrial nodes.

Referring to FIG. 7, in an additional preferred embodiment, the hybrid satellite communications system includes a plurality of terrestrial nodes 57. The terrestrial nodes operate in similar manner to the MSS satellite 2 and MSS ground station 3 shown in FIGS. 1 and 3 in that they relay uplink signals 36 from the user's computer 1 to an Internet Service Provider 4. More particularly, where a user's computer is capable of communicating directly with a terrestrial node, in a preferred embodiment, transmission of the uplink signals 3 is made directly with the terrestrial node instead of the MSS satellite 2 in a frequency band substantially lower than the transmission of downlink signal by the DBS satellite to the user's computer. Typically it would be less expensive for a user's computer to communicate directly with a terrestrial node to transmit information or data to an Internet Service Provider. However, for this embodiment of the invention, where it is impossible to communicate with a terrestrial node for example due to too many users on the system, the computer's user may switch, automatically or based on instructions by the user, to transmitting uplink signals to the MSS satellite 2.

Having described my invention in such terms as to enable those skilled in the art to understand and practice it, and having defined and identified the presently preferred embodiments thereof, I claim:

1. A hybrid satellite communications system comprising:
   an earth orbiting satellite means including a first transceiver for receiving and transmitting a first set of signals and a second transceiver for receiving and transmitting a second set of signals, said first set of signals being transmitted from said satellite means to the earth in a first frequency band selected from X band and K band, said second set of signals being transmitted from the earth to said satellite means in a second frequency band selected from L band and S band;
   terrestrial communications means for transmitting said first set of signals to said satellite means and for receiving said second set of signals from said satellite means; and
   a plurality of user units, each of said user units including a transceiver for transmitting said second set of signals in said second frequency band selected from L band and S band to said satellite means and for receiving said first set of signals in said first frequency band selected from X band and K band from said satellite means;
   said user units personal computers constructed for communicating with the Internet, said said terrestrial communications means is connected to the Internet for providing said personal computers access to the Internet through said terrestrial communications means and said satellite means wherein Internet communications is transmitted to said user units in said first frequency band selected from X band and K band from said satellite means and Internet communications is transmitted from said user units in said second frequency band selected from L and S band to said satellite means.

2. The hybrid satellite communications system of claim 1 wherein said earth orbiting satellite means includes two satellites with a first satellite including said first transceiver for receiving and transmitting said first set of signals in said first frequency band, and with a second satellite including said second transceiver for receiving and transmitting said second set of signals in said second frequency band.

3. The hybrid satellite communications system of claim 1 wherein said first frequency band is between 12.0 GHz–13.0 GHz and said second frequency band is between 1.0 GHz–3.0 GHz.

4. The hybrid satellite communications system of claim 1 wherein said terrestrial communications means includes at least two ground stations, a first ground station being provided to transmit said first set of signals in said first frequency band to said satellite means and a second ground station being provided to receive said second set of signals in a second frequency band from said satellite means.

* * * * *